United States Patent
Wijnands et al.

(10) Patent No.: US 11,310,154 B2
(45) Date of Patent: Apr. 19, 2022

(54) ENABLING MULTICAST-LABEL-DISTRIBUTION-PROTOCOL (MLDP) ON NON-MLDP DEVICES

(71) Applicant: Cisco Technology, Inc., San Jose, CA (US)

(72) Inventors: IJsbrand Wijnands, Leuven (BE); Lukas Krattiger, Pleasanton, CA (US); Mankamana Prasad Mishra, San Jose, CA (US); Brian Christopher Farnham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 16/582,906

(22) Filed: Sep. 25, 2019

(65) Prior Publication Data
US 2021/0092056 A1 Mar. 25, 2021

(51) Int. Cl.
| | |
|---|---|
| *H04L 12/723* | (2013.01) |
| *H04L 12/721* | (2013.01) |
| *H04L 12/751* | (2013.01) |
| *H04L 12/741* | (2013.01) |
| *H04L 45/50* | (2022.01) |
| *H04L 12/18* | (2006.01) |
| *G06F 16/22* | (2019.01) |
| *H04L 45/02* | (2022.01) |
| *H04L 67/10* | (2022.01) |

(52) U.S. Cl.
CPC ............ *H04L 45/507* (2013.01); *G06F 16/22* (2019.01); *H04L 12/185* (2013.01); *H04L 45/02* (2013.01); *H04L 67/10* (2013.01)

(58) Field of Classification Search
CPC ..... H04L 45/507; H04L 12/185; H04L 45/02; H04L 67/10; H04L 45/60; H04L 45/70
See application file for complete search history.

(56) References Cited

U.S. PATENT DOCUMENTS

| | | | |
|---|---|---|---|
| 6,556,544 B1 * | 4/2003 | Lee .......................... | H04L 12/18 370/256 |
| 2010/0157837 A1 * | 6/2010 | Lv ........................... | H04L 43/18 370/252 |
| 2012/0057466 A1 * | 3/2012 | Allan ..................... | H04L 45/125 370/238 |

(Continued)

*Primary Examiner* — Faruk Hamza
*Assistant Examiner* — Abusayeed M Haque
(74) *Attorney, Agent, or Firm* — Lee & Hayes, P.C.

(57) ABSTRACT

In one embodiment, a first label-distribution-protocol (LDP) session is established between a first interface of a first computing device and a second computing device, while a second LDP session is established between a second interface and the second computing device. The method may further comprise receiving a request from a third computing device to subscribe to a multicast group, storing an association between a first label, the multicast group, and the first interface, and sending, to the second computing device via the first LDP session, an indication that the first label is associated with the multicast group. Further, the method may include receiving a request from a fourth computing device to subscribe to the multicast group, storing an association between a second label, the multicast group and, the second interface, and sending, via the second LDP session, an indication that the second label is associated with the multicast group.

18 Claims, 14 Drawing Sheets

(56) References Cited

U.S. PATENT DOCUMENTS

| | | | |
|---|---|---|---|
| 2012/0314714 A1* | 12/2012 | Hu | H04L 45/50 370/401 |
| 2015/0078377 A1* | 3/2015 | Wijnands | H04L 45/16 370/390 |
| 2015/0215198 A1* | 7/2015 | Wijnands | H04L 45/245 370/392 |
| 2015/0372828 A1* | 12/2015 | Hao | H04L 45/16 370/390 |
| 2016/0277290 A1* | 9/2016 | Sivabalan | H04L 45/50 |
| 2018/0287934 A1* | 10/2018 | Wang | H04L 12/4625 |
| 2019/0036717 A1* | 1/2019 | Kebler | H04L 12/185 |
| 2020/0099543 A1* | 3/2020 | Taylor | H04L 12/189 |
| 2020/0344155 A1* | 10/2020 | Chhibber | H04L 45/16 |
| 2021/0036986 A1* | 2/2021 | Qi | H04L 61/2007 |

* cited by examiner

ENABLING MULTICAST-LABEL-DISTRIBUTION-PROTOCOL (MLDP) ON NON-MLDP DEVICES

TECHNICAL FIELD

The present disclosure relates generally to techniques enabling multicast over label-distribution-protocol (mLDP) within networks that include non-mLDP-enabled nodes.

BACKGROUND

In today's digital world, more and more service providers manage and provide computing resources to users to fulfill needs of the users without the users having to invest in and maintain their own computing infrastructure. For example, cloud computing often involves the use of networks of data centers which house servers, routers, and other devices that provide computing resources to users such as compute resources, networking resources, storage resources, database resources, application resources, and so forth. Users may be allocated portions of the computing resources, including portions of one or more host servers that may provide compute functionality and one or more target servers that may provide storage for use by the host servers.

Within such data-center architectures, communications between computing devices are often routed through an array of switches, routers, and other computer networking devices. In some instances, these computing devices utilize multiprotocol label switching (MPLS), in which the devices direct data traffic from one device (or "node") to the next using path labels rather than long network addresses, thereby avoiding expensive lookups in a routing table and resulting in increased traffic flow. In some instances, the nodes exchange label information with one another prior to forwarding these labeled packets through the network.

In addition, some of the communications between computing devices of these architectures comprise group communications that are addressed to groups of destination computing devices, wherein each of these destination computing devices has previously subscribed to the group in order to receive the group communications. For example, some of the communications comprise multicast messages, where a packet originating from a source may be sent to each of multiple computing devices that has subscribed to receive this multicast traffic. However, some computing devices in these architectures are not configured to implement label-switching techniques, thus resulting in a network in which some nodes are able to utilize label-distribution techniques and others are not.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
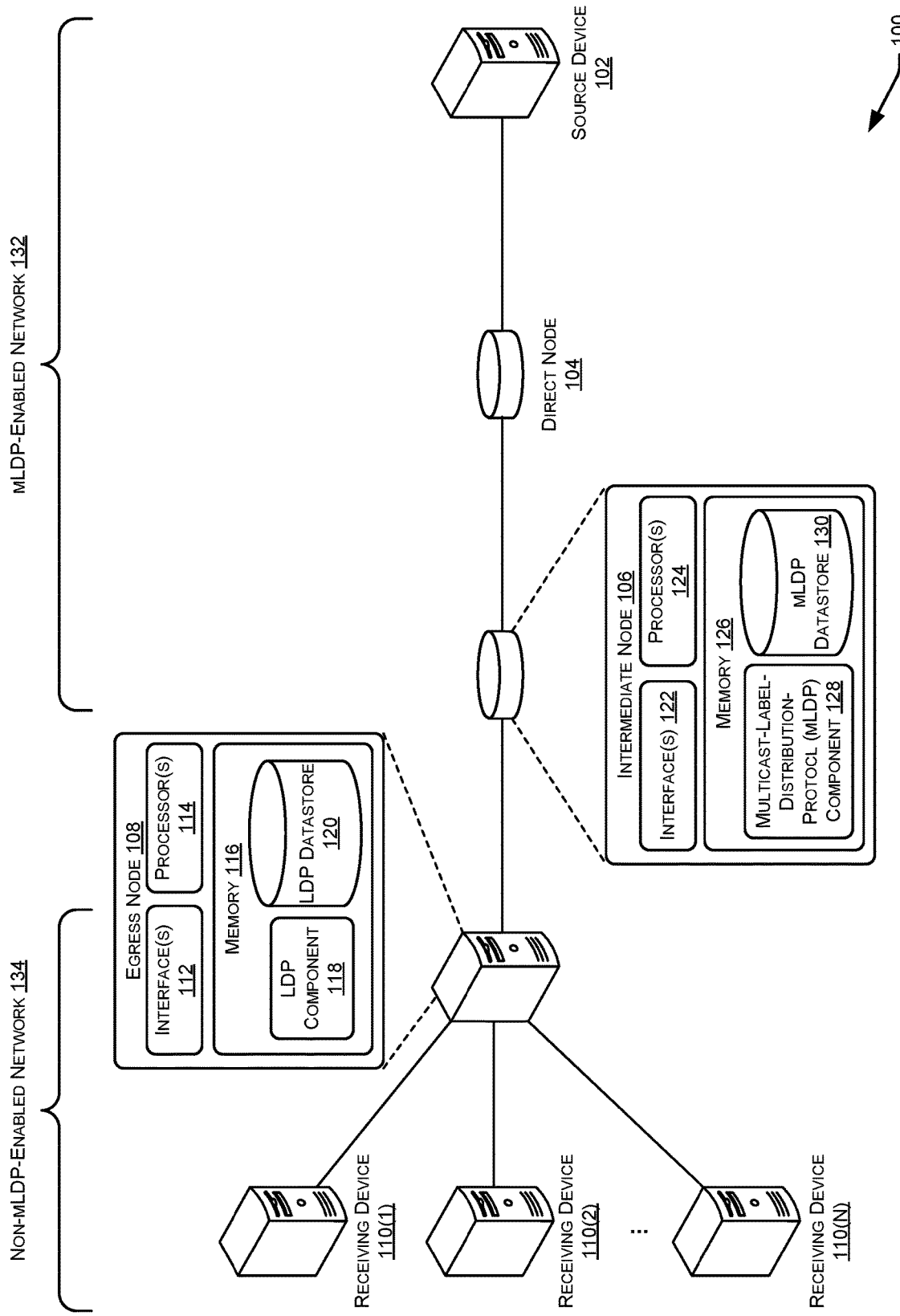
FIG. 1 illustrates a system-architecture diagram of an example environment in which a source device sends multicast traffic to one or more nodes of a network, some of which are configured to implement multicast over label-distribution-protocol (mLDP) techniques, and some of which are not. Thus, an egress node that couples the mLDP-enabled portion of a network to the non-mLDP-enabled portion of the network may be configured to implement techniques to ensure that the multicast traffic originating from the source device reaches each receiving device, regardless of whether one or more nodes therebetween are configured to implement mLDP.

This disclosure describes, in part, a method implemented at least in part by a first computing device. This method may comprise establishing a first label-distribution-protocol (LDP) session between a first interface of the first computing device and a second computing device coupled to the first computing device, as well as establishing a second LDP session between a second interface of the first computing device and the second computing device. The method may further comprise receiving, at the first computing device, a request from a third computing device to subscribe to a multicast group, the third computing device coupled to the first computing device via the first interface. In addition, the method may include storing, in an LDP datastore of the first computing device, an association between a first label, the multicast group, and the first interface and sending, by the first computing device and to the second computing device via the first LDP session, an indication that the first label is associated with the multicast group. Further, the method may include receiving, at the first computing device, a request from a fourth computing device to subscribe to the multicast group, the fourth computing device coupled to the first computing device via the second interface, storing, in the LDP datastore, an association between a second label, the multicast group and, the second interface, and sending, by the first computing device and to the second computing device via the second LDP session, an indication that the second label is associated with the multicast group.

This disclosure also describes, in part, a method comprising sending, from a first computing device to a second computing device, a first label-distribution-protocol (LDP) discovery message and establishing a first LDP session between a first interface of the first computing device and the second computing device at least partly in response to the sending of the first LDP discovery message. In addition, this method may include sending, from the first computing device to the second computing device, a second LDP discovery message and establishing a second LDP session between a second interface of the first computing device and the second computing device at least partly in response to the sending of the second LDP discovery message.

This disclosure also describes, in part, a first computing device comprising a first interface, a second interface, a third interface, one or more processors, and one or more non-transitory computer-readable media storing computer-executable instructions. In some instances, the first computing device may be configured to receive, from a second computing device and via the first interface, a first data packet associated with a first label, determine that the first label is associated with the second interface, and send at least a portion of the first data packet to a third computing device via the second interface. In addition, the first computing device may be configured to receive, from the second computing device and via the first interface, a second data packet associated with a second label, the second data packet comprising a copy of at least a portion of the first data packet. The first computing device may further determine that the second label is associated with the third interface and send at least a portion of the second data packet to a fourth computing device via the third interface.

Additionally, the techniques described herein may be performed via methods, devices, and/or non-transitory computer-readable media storing computer-executable instructions that, when executed by one or more processors, performs methods described herein.

Example Embodiments

Typical data-center architectures include interconnected computer networking devices (e.g., switches, routers, etc.) configured to route immense amounts of traffic to other devices in the architecture. This traffic may include multicast traffic or other communications specifying respective identifiers of groups of computing devices. For example, these architectures may route traffic for a specified multicast group from a source to each destination device of a group of destination computing devices. In some instances, each destination device may subscribe to receiving communication from the source by subscribing to a particular internet protocol (IP) address associated with the multicast group, "(S,G)", where S represents the source of the communications and G represents identifier (e.g., IP addresses) of each receiving computing device that has subscribed to the group.

When a source device associated with a particular multicast group sends a packet, the source may initially send the packet to a computing device, or "node" in the network that directly couples to the source device. The node device may then forward along the packet to one or more other nodes in the network, each of which may continue to do the same, such that the packet (or copies thereof) ultimately reach each destination device that has subscribed to receive this multicast traffic. In some instances, a node in the network may replicate the packet and send a respective copy of the packet to respectively different nodes in the network. For example, the node that directly couples to the source device may replicate the packet and send a first copy of the packet to a first node and a second copy of the packet to a second node.

Within this type of architecture, in order to avoid complex and relatively computationally expensive lookups in a router table, some nodes of the network may utilize multiprotocol label switching (MPLS), or a routing technique in which data is directed between nodes of the network using short-path labels rather than long network addresses. As is known, these labels identify virtual links, or "paths", between adjacent nodes, rather destination devices.

In order to enable MPLS within a network, nodes within the network may exchange label information with their neighboring nodes. For example, nodes within a network may utilize label distribution protocol (LDP) for exchanging label mapping information between LDP peers in the network. For example, a first node (e.g., router, switch, etc.) may send out an LDP discovery message to each of its adjacent nodes (or "LDP peers") in the network. The first node may then establish an LDP session within each LDP peer, during which time these nodes bi-directionally exchange label information within one another. Each LDP peer may store the label information in an LDP datastore, such that the respective LDP peer is able to append the appropriate label information to packets forwarded through the system.

In some instances, certain nodes in the network may be configured to implement multicast-over-LDP (mLDP) techniques. In these instances, the node may be configured to both store label information associated with LDP peers, as well as replicate and send multicast traffic to multiple peers if needed. For example, envision that a first mLDP-enabled node couples to a second node and a third node within a network, and that both the second and third nodes have subscribed to a particular multicast route. Further, envision that the second node has informed the first node that the second node is to receive multicast traffic according to a first label (e.g., "Label X") and the third node has informed the first node that the third node is to receive the multicast traffic according to a second label (e.g., "Label Y").

Upon receiving a data packet for the corresponding multicast group, the first node may access its LDP datastore to determine that the first node is to send a first copy of the data packet to the second node and a second copy of the data packet to the third node (given that they have both subscribed to this multicast group). In addition, the first node may determine that the second node has requested to receive this traffic using the first label ("Label X") and the third node has requested to receive this traffic using the second label ("Label Y"). In response, the first node may replicate the data packet, append the first label to a first copy of the data packet, and send the first, labeled data packet to the second node. In addition, the first node may append the second label to a second copy of the data packet and send the second, labeled data packet to the third node.

In other instances, however, the network may include one or more nodes that are not mLDP-enabled. That is, while this nodes may implement technologies that enable LDP for single, or "unicast", communications, these technologies might not be configured to both replicate and label multicast communications, as done via mLDP. The techniques described below may, in some instances, address these shortcomings and enable mLDP in a network that includes a first portion that is mLDP-enabled and a second portion that is not.

To provide an example, envision that a first non-mLDP-enabled node couples in a network to a second, mLDP-enabled node via an ingress interface of the first node. Further, envision that the first, non-mLDP-enabled node couples to a first receiving device (e.g., a switch, router, destination device, etc.) via a first egress interface and to a second receiving device via a second egress interface. In addition, envision that the first and second receiving devices have sent (on their behalf or on behalf of destination devices further downstream in the network) respective requests to the first, non-mLDP-enabled node to receive multicast traffic associated with a particular multicast group. Further, envision, that the second node resides upstream (i.e., towards the source device of the multicast group) relative to the first node.

As noted above, given that the first node is not enabled to perform mLDP, the first node would ordinarily be unable to route the multicast traffic to the first and second receiving devices using a label-switching protocol. However, as described below, the first node may be configured to effectively offload the replication of the data packets inherent in mLDP to the second, mLDP-enabled node in order to allow the multicast traffic to reach the first and second receiving devices (and beyond) within the LDP-type network.

To do so, rather than broadcast a single LDP discovery request to the second node, the first node may broadcast an LDP discovery request for each of its multiple egress interfaces. For instance, in the example above, the first node may broadcast a first LDP discovery message to the second node (and each other LDP peer of the first node) corresponding to the first egress interface of the first node, and a second LDP discovery message corresponding to the second egress interface of the first node. Upon receiving these two LDP discovery messages, the first and second nodes may be configured to establish first and second LDP sessions, as if the second node were connected to two discrete devices as opposed to a single device. That is, because the first node has broadcasted two LDP discovery messages (one for each egress interface) to the second node, the first and second node may establish two LDP sessions, rather than one.

Further, envision that both the first and second receiving devices have sent requests to the first node to receive the multicast traffic associated with a particular group. In response to receiving the first request from the first receiving device via the first egress interface, the first node may associate a first label (e.g., "Label X") with the specified multicast group and with the first egress interface. The first node may also send, to the second node and via the first LDP session, an indication of the association between the first label and the first multicast group.

Meanwhile, upon receiving the second request from the second receiving device via the second egress interface, the first node may associate a second label (e.g., "Label Y") with the specified multicast group and with the second egress interface. The first node may also send, to the second node and via the second LDP session, an indication of the association between the second label and the first multicast group. At this point, the second node may therefore be configured to, upon receiving a data packet associated with the specified multicast group, send one copy of the data packet with the first label via the first LDP session (associated with the first egress interface of the first node) and one copy of the data packet with the second label via the second LDP session (associated with the second egress interface of the first node).

For example, envision that the second node receives a data packet associated with the specified multicast group. The second node may access its LDP datastore to determine that a first LDP peer (the first egress interface of the first node) and a second LDP peer (the second egress interface of the first node) have requested to receive traffic from this multicast group. In addition, the second node may determine, from its LDP datastore, that the first LDP peer has requested that traffic for this group be sent with the first label ("Label X") and that the second LDP peer has requested that traffic for this group be sent with the second label ("Label Y"). Thus, the second, mLDP-enabled node may replicate the data packet, append the first label to the packet, and send this first copy of the packet to the first egress interface of the first node via the first LDP session. In addition, the second node may append the second label to a second copy of the packet and send this second copy of the packet to the second egress interface of the first node via the second LDP session. In some instances, and as is known, appending each respective label may include removing a local label associated with the second node and replacing it with the respective label indicated in the LDP datastore.

By offloading the replication of the data packet to an mLDP-enabled node, the above techniques thus enable mLDP in a network that includes a first, mLDP-enabled portion and a second, non-mLDP enabled portion. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram in which computing devices route traffic, such as multicast traffic, within at least a portion of a network 100. The network 100 may comprise an array of computing devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the network 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, the network 100 may include a source server device 102 (or "source device 102") that originates communication(s) that are sent to devices within the network 100. In some instances, the communications 106 comprise unicast communications, broadcast communications, multicast communications, and/or any type of communications originating from a source 104 and addressed to one or more receiving computing devices. For example, the source device 102 may second communications associated with a specified group of computing devices. In these instances, the communication may comprise a multicast communication that is sent, via devices in the network 100, to each destination device that has subscribed to the multicast group, or "route". As such, the network 100 may receive these communications and forward them along to one or more computer networking devices towards the destination device(s).

In the illustrated example, the source device 102 may couple to a direct node (e.g., switch, router, or other computing device), which in turn may couple to an intermediate node 106 (e.g., switch, router, or other computing device). In the illustrated example, the direct and intermediate nodes may be mLDP-enabled. The intermediate node 106, meanwhile, may couple to an egress node 108, which may represent a node connecting an mLDP-enabled portion of the network 132 with an non-mLDP-enabled portion of the network 134. Thus, while the egress node couples to the mLDP-enabled intermediate node 106 via an ingress interface, the egress node 108 also couples to one or more receiving devices 110(1), (2), . . . , (N) that, like the egress node 108, are not mLDP-enabled. The receiving devices 110(1)-(N) may comprise destination devices and/or may comprise other types of computing devices (e.g., switches, nodes, etc.) that also forward traffic nearer the destination devices. Further, while FIG. 1 illustrates an example network in which the claimed techniques may be described, it is to be appreciated that this that the techniques may be implemented in an array of other networked environments having an array of other devices.

As illustrated, the egress node 108 may include one or more interfaces 112. For example, the egress node 108 may include one or more egress interfaces to which respective receiving devices 110(1)-(N) couple, as well as one or more ingress interfaces. In this example, the receiving device 110(1) may couple to the egress node 108 via a first egress interface, the receiving device 110(2) may couple to the egress node 108 via a second egress interface, and the receiving device 110(N) may couple to the egress node 108 via a third egress interface. The intermediate node 106, meanwhile, may couple to the egress node 108 via an ingress interface of the egress node 108 (and via one of its own interfaces 122).

The egress node 108 may further include one or more hardware processors 114 and memory 116, which may store a label-distribution-protocol (LDP) component 118 and an LDP datastore. The intermediate node 106, meanwhile, may include one or more interfaces 122, one or more hardware processors 124 and memory 126. The memory 126 may store a multicast-LDP (mLDP) component 128 and an mLDP datastore 130.

In some instances, the LDP component 118 of the egress node may be configured to determine its LDP peers and broadcast, to each peer, a number of LDP discovery messages equal to the number of egress interfaces (or the number of egress interfaces coupled to a respective receiving device in the network). For example, the LDP component 118 may determine that the intermediate node 106 is an LDP peer and, thus, may broadcast at least three LDP discovery messages to the intermediate node 106, with each LDP discovery message corresponding to one of the three egress interfaces coupled to a respective receiving device 110. Similarly, the mLDP component 128 of the intermediate node 106 may determine its LDP peers (e.g., egress node 108 and direct node 104) and may broadcast a corresponding LDP discovery message to each determined LPD peer.

The LPD component 118 and the mLDP component 128 may establish one or more LDP sessions in response to the LDP discovery messages. For example, these components may establish, in the illustrated example, a first LDP session between the intermediate node 106 and the first egress interface of the egress node 108, a second LDP session between the intermediate node 106 and the second egress interface of the egress node 108, and a third LDP session between the intermediate node 106 and the third egress interface of the egress node 108. Therefore, rather than establishing a single LDP session between the intermediate node 106 and the egress node 108, an LDP session may be established between the intermediate node 106 and each egress interface of the egress node 108.

In addition, envision that the receiving device 110(1) sends a request to the egress node 108 to subscribe to the multicast group associated with the source device 102. In response to receiving this request, the LDP component 118 may store, in an LDP datastore of the egress node 108, an association between a first label, the first egress interface (over which the receiving device 110(1) couples), and the multicast group. In addition, the LDP component 118 may send, to the mLDP component 128 of the intermediate node 106 and over the first established LDP session, an indication of the first label and the request to receive the multicast traffic from the source device 102. The intermediate node 106 may then store, in an mLDP datastore 130 an indication of this first label in association with the first LDP session and the multicast group.

Similarly, envision that the receiving device 110(2) also sends a request to the egress node 108 to subscribe to the multicast group associated with the source device 102. In response to receiving this request, the LDP component 118 may store, in an LDP datastore of the egress node 108, an association between a second label, the second egress interface (over which the receiving device 110(2) couples), and the multicast group. In addition, the LDP component 118 may send, to the mLDP component 128 of the intermediate node 106 and over the second established LDP session, an indication of the second label and the request to receive the multicast traffic from the source device 102. The intermediate node 106 may then store, in an mLDP datastore 130 an indication of this second label in association with the second LDP session and the multicast group.

Finally, in this example envision that the receiving device 110(N) also sends a request to the egress node 108 to subscribe to the multicast group associated with the source device 102. In response to receiving this request, the LDP component 118 may store, in an LDP datastore of the egress node 108, an association between a third label, the third egress interface (over which the receiving device 110(N) couples), and the multicast group. In addition, the LDP component 118 may send, to the mLDP component 128 of the intermediate node 106 and over the third established LDP session, an indication of the third label and the request to receive the multicast traffic from the source device 102. The intermediate node 106 may then store, in an mLDP datastore 130 an indication of this third label in association with the third LDP session and the multicast group.

At this point, the intermediate node 106 may be configured to generate multiple copies of any received data packets associated with the specified multicast group and forward them, with the appropriate labels, over the three LDP sessions established with the egress node 108. For example, envision that the source device 102 sends, to the direct node 104, a data packet associated with the multicast group. The direct node 104 may send, to the intermediate node, the packet along with a label that the intermediate note 106 has previously instructed the direct node 104 to append to traffic for this particular multicast group.

Upon receiving the labeled data packet, the mLDP component 128 of the intermediate node 106 may access its mLDP datastore 130 to determine that the packet is to be forwarded along to three different LDP peers, namely the first, second, and third egress interfaces of the egress node 108. Thus, the mLDP component 128 may generate three copies of the data packet and append the appropriate labels to each copy. For instance, the mLDP component 128 may swap the current label (appended by the direct node 104) with the first label associated with the first egress interface of the egress node 108 and may forward this first labeled packet to the egress node 108 via the first LDP session. Upon receiving this first labeled data packet, the egress node 108 may determine, using the first label and the LDP datastore 120, that this packet is to be sent to the receiving device 110(1). Thus, the LDP component 118 may remove the first label and send the data packet along to the receiving device 110(1).

In addition, the mLDP component 128 may append a second label associated with the second egress interface of the egress node 108 and may forward this second labeled packet to the egress node 108 via the second LDP session. Upon receiving this second labeled data packet, the egress node 108 may determine, using the second label and the LDP datastore 120, that this packet is to be sent to the receiving device 110(2). Thus, the LDP component 118 may remove the second label and send the data packet along to the receiving device 110(2).

Similarly, the mLDP component 128 may append a third label associated with the third egress interface of the egress node 108 and may forward this third labeled packet to the egress node 108 via the third LDP session. Upon receiving this third labeled data packet, the egress node 108 may determine, using the third label and the LDP datastore 120, that this packet is to be sent to the receiving device 110(N). Thus, the LDP component 118 may remove the third label and send the data packet along to the receiving device 110(N).

By offloading the replication process from the egress node 108 to the intermediate node 106 coupled to the egress node 108, the techniques thus the non-mLDP enabled portion of the network 134 to receive and forward multicast traffic from the mLDP-enabled portion of the network 132. While FIG. 1 provides an introduction of these techniques, the following description provides additional details.

Figure 2A:
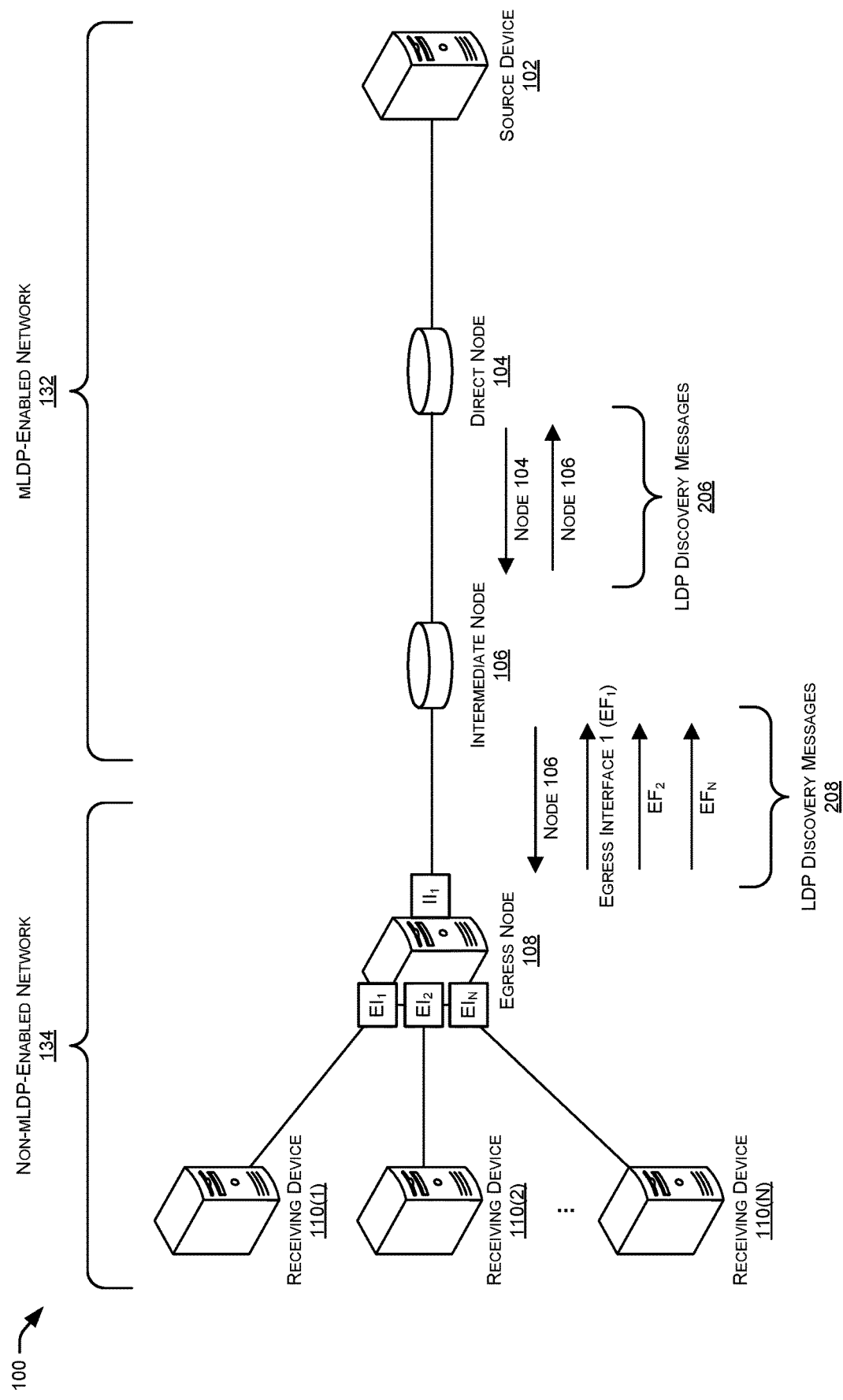
FIG. 2A illustrates an example scenario within the architecture of FIG. 1 in which the egress node sends multiple LDP discovery messages to an intermediate node to which the egress node couples. For example, the egress node may send a number of LDP discovery messages that is equal to a number of egress interfaces of the egress node that are coupled to downstream, receiving devices. By sending multiple LDP discovery messages to the intermediate node, the egress node effectively causes the intermediate node to establish LDP sessions with respective egress interfaces of the egress node, rather than a single LDP session with the egress node.

FIG. 2A illustrates an example scenario within the network in which the egress node 108 sends multiple LDP discovery messages to the intermediate node 106 to which the egress node 108 couples. For example, the egress node 108 may send a number of LDP discovery messages that is equal to a number of egress interfaces of the egress node that are coupled to downstream, receiving devices. By sending multiple LDP discovery messages to the intermediate node 106, the egress node 108 effectively causes the intermediate node 106 to establish LDP sessions with respective egress interfaces of the egress node 108, rather than a single LDP session with the egress node 108.

As illustrated, the mLDP-enabled portion of the network 132 may include the source device 102, the direct node 104, and the intermediate node 106. The intermediate node and the direct node 104 may send a respective LDP discovery message, resulting in an LDP session, as described below with reference to FIG. 2B. That is, given that both of these nodes are configured to perform mLDP, each node may send a single discovery message to the other node.

In addition, the intermediate node 106 and the egress node 108, being LDP neighbors of one another, may also be configured to send LDP discovery messages to one another. For example, the intermediate node 106 may send a single LDP discovery message to the egress 108. The egress node 108, however, may be configured to send a number of the LDP discovery messages 208 equal to the number of egress interfaces of the egress node that are coupled to downstream, receiving devices.

In this example, the first receiving device 110(1) couples to the egress node via a first egress interface ($EI_1$), while the second receiving device 110(2) couples to the egress node via a second egress interface ($EI_2$), and the third receiving device 110(N) couples to the egress node via a third egress interface ($EI_3$). Thus, the egress node 108 may be configured to send three different LDP discovery messages to the intermediate node, each corresponding to a respective egress interface. Further, it is to be appreciated that each of these LDP discovery messages 208 sent from the egress node 108 may be sent via the same ingress interface via which the egress node 108 and the intermediate node 106 couple.

Figure 2B:
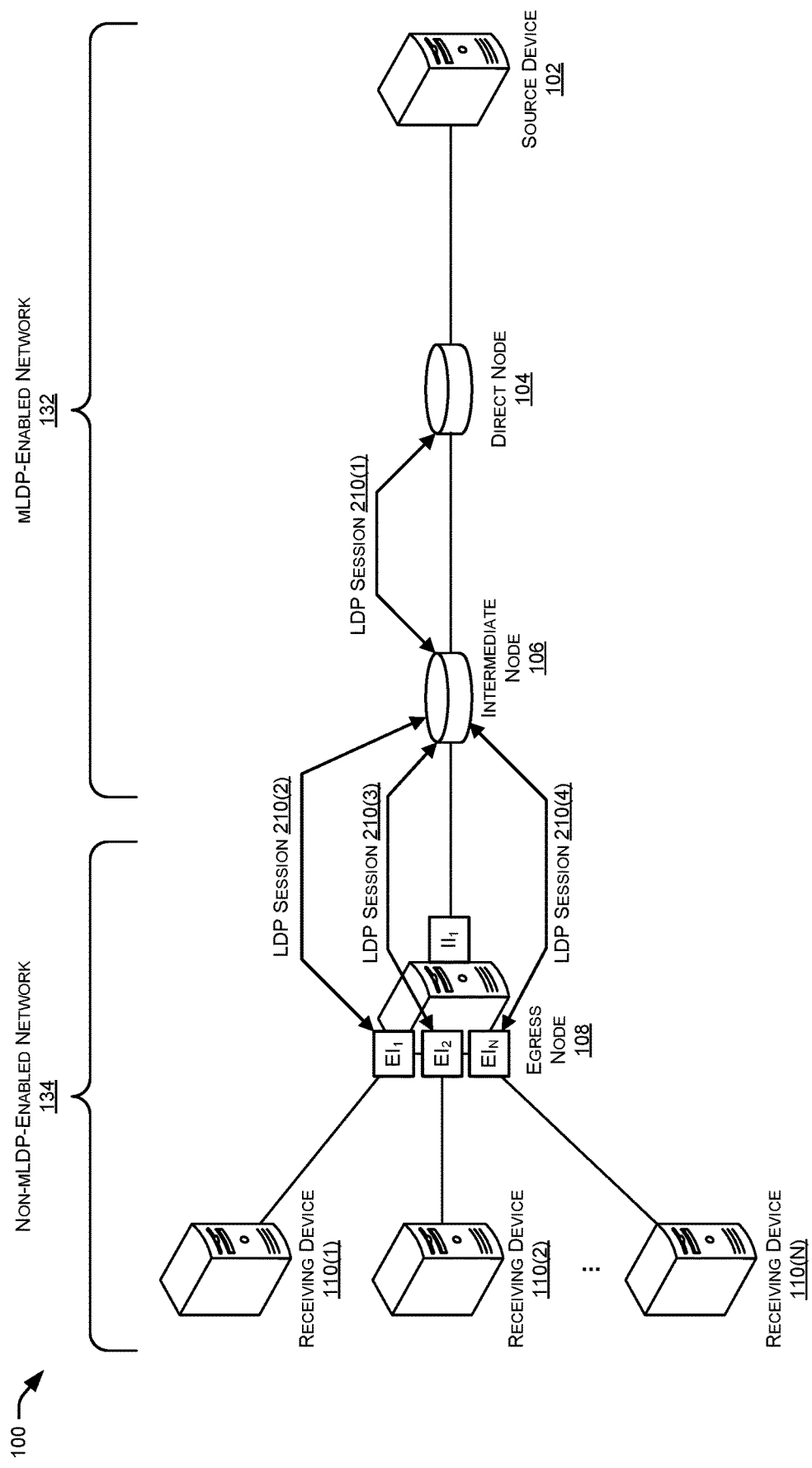
FIG. 2B illustrates an example scenario within the architecture of FIG. 1 in which the intermediate node establishes an LDP session with each respective egress interface of multiple egress interfaces of the egress node. As will be shown below, these multiple LDP sessions may cause the intermediate node to replicate multicast traffic on behalf of the egress node prior to the egress node forwarding the multicast traffic along to each receiving device coupled to an egress interface of the egress node.

FIG. 2B continues the example scenario and illustrates that while the intermediate node 106 and the direct node 104 may established a single LDP session 210(1), the intermediate node 106 and the egress node 108 have established LDP sessions 210(2), 210(3), and 210(4). That is, in this example the intermediate node 106 has established a respective LDP session with each respective egress interfaces of the egress node. Stated otherwise, the egress and intermediate nodes established a number of LDP sessions equal to the number of LDP discovery messages (in this example, three) sent by the egress node 108 in FIG. 2A. As will be shown below, these multiple LDP sessions 210(2)-(4) may cause the intermediate node 106 to replicate multicast traffic on behalf of the egress node 108 prior to the egress node 108 forwarding the multicast traffic along to each receiving device coupled to an egress interface of the egress node.

Figure 2C:
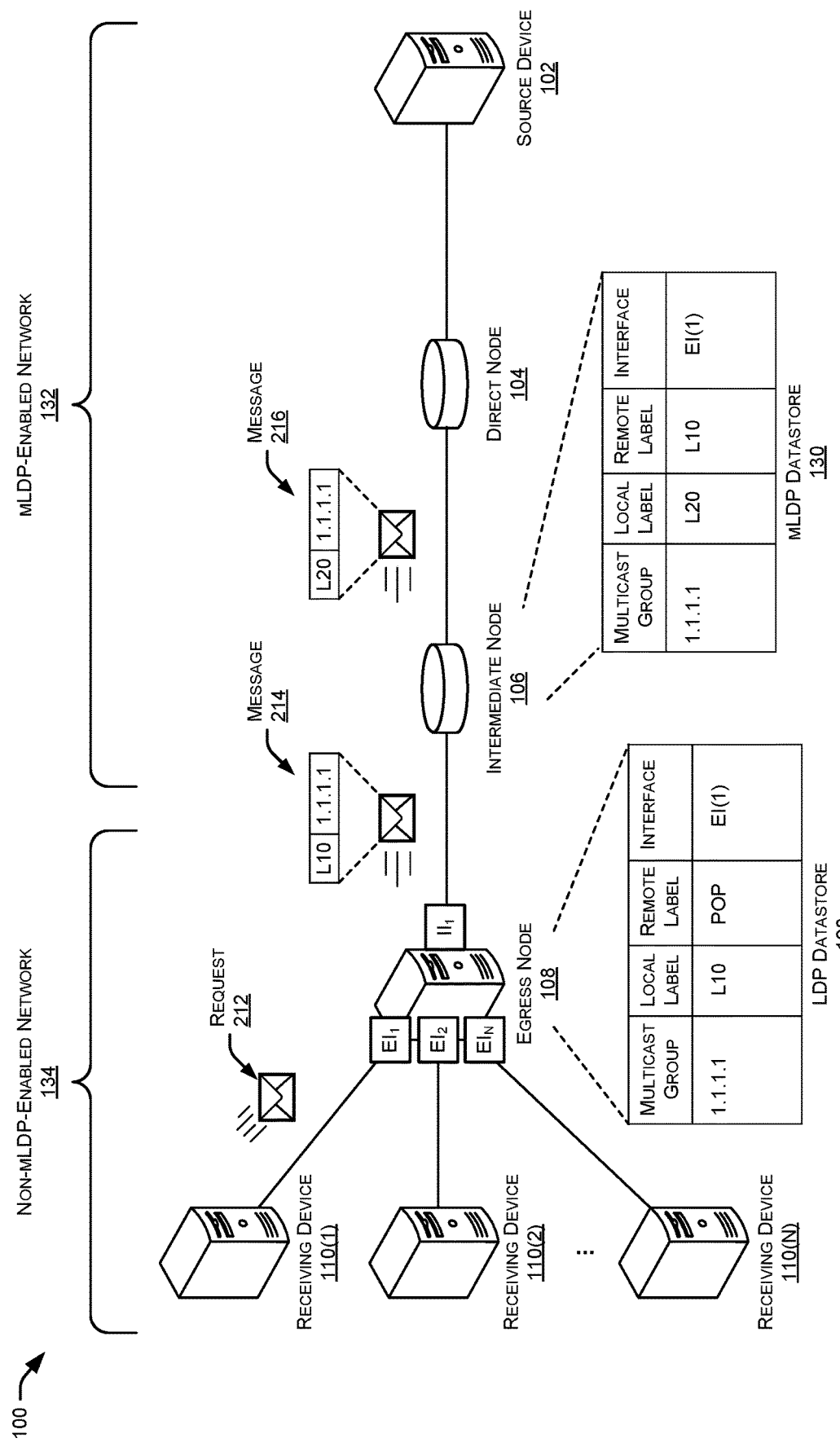
FIG. 2C illustrates an example scenario where a first receiving device coupled to a first egress interface of the egress node has requested to subscribe to a particular multicast group associated with the source device. In response, the egress node stores an association between a first label and the first interface and shares this first label with the intermediate node such that the intermediate node may attach this first label prior to forwarding multicast traffic from the source device to the egress node via the first LDP session.

FIG. 2C continues the example scenario and illustrates that the first receiving device 110(1), coupled to the first egress interface of the egress node 108, sends a request 212 to subscribe to a particular multicast group associated with the source device 102. In response, the egress node 108 stores, in its LDP datastore 120, an association between the specified multicast group (e.g., "1.1.1.1"), a first local label (e.g., "L10"), a remote label (in this example, POP, given that the receiving devices do not utilize LDP), and the egress interface associated with the receiving device 110(1) that sent the request (e.g., "EI(1)").

After storing this information in the LDP datastore 120, the egress node 108 may send a message 214 to the intermediate node via the first established LDP session indicating a request to subscribe to the multicast group and an indication of the label that the intermediate node should apply to this traffic. For instance, in this example, the message 214 specifies the requested multicast group ("1.1.1.1") and the label to apply this group ("L10"). Upon receiving this message 214, the intermediate node 106 may store, in its mLDP datastore 130, an indication of the multicast group (e.g., "1.1.1.1"), a local label to be used by the intermediate node (e.g., "L20"), the specified remote label (e.g., "L10"), and the interface of the intermediate node 106 over which to send this traffic (e.g., "EI(1)"). In addition, the intermediate node 106 may send, to the direct node 104 and via the LDP session established between these nodes, a message 216 indicating the request to receive the multicast traffic for the specific group ("1.1.1.1") and the label to apply to this traffic ("L20").

Figure 2D:
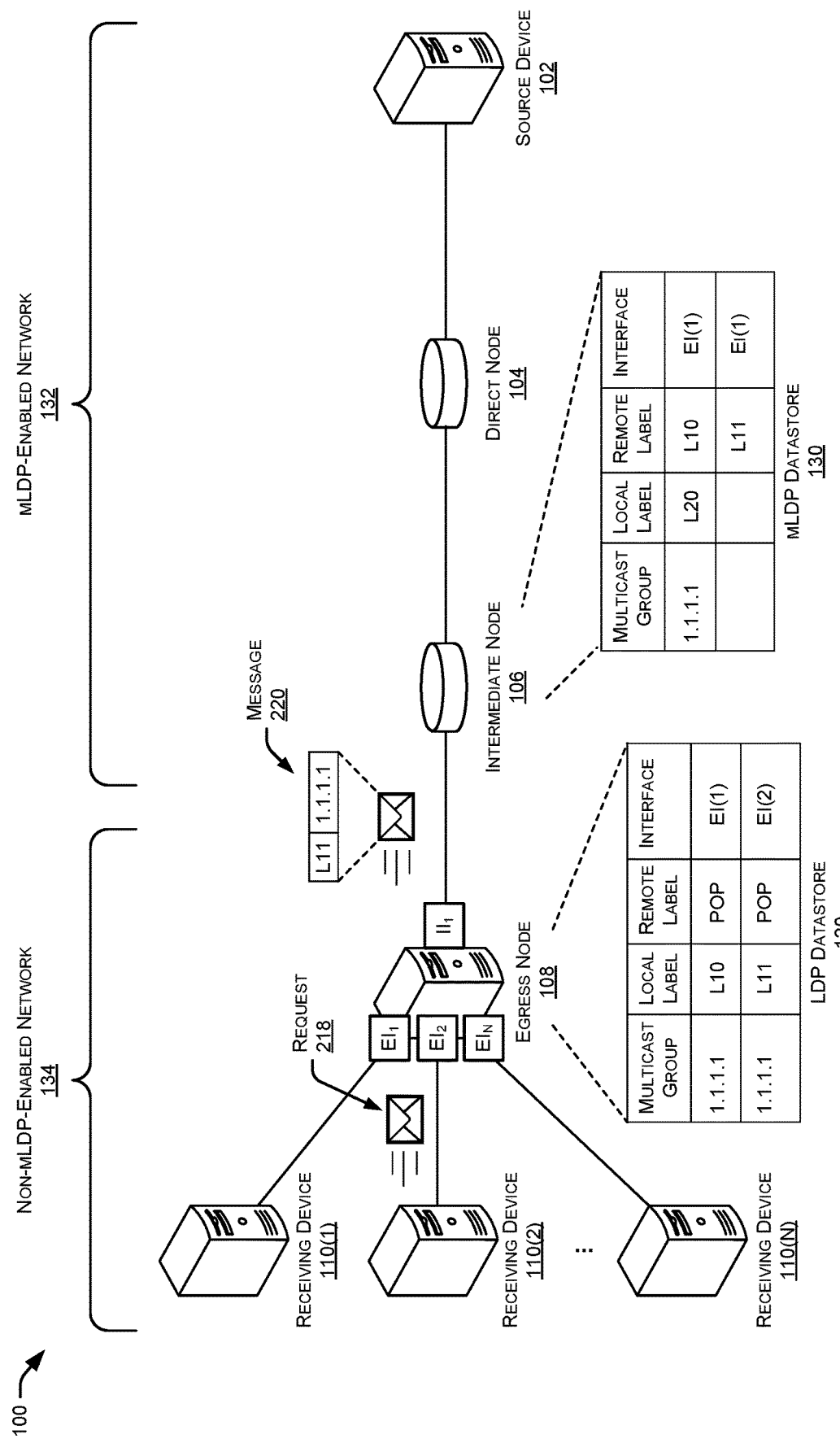
FIG. 2D illustrates an example scenario where a second receiving device coupled to a second egress interface of the egress node requests to subscribe to the multicast group. In response, the egress node stores an association between a second label and the second interface and shares this information the intermediate node such that the intermediate node may attach this second label prior to forwarding multicast traffic from the source device to the egress node via the second LDP session.

FIG. 2D continues the example scenario and illustrates that the second receiving device 110(2), coupled to the second egress interface of the egress node 108, sends a request 218 to subscribe to the same multicast group associated with the source device 102. In response, the egress node 108 stores, in its LDP datastore 120, an association between the specified multicast group (e.g., "1.1.1.1"), a second local label (e.g., "L11"), the remote label (in this example, POP, given that the receiving devices do not utilize LDP), and the egress interface associated with the receiving device 110(2) that sent the request (e.g., "EI(2)").

After storing this information in the LDP datastore 120, the egress node 108 may send a message 220 to the intermediate node via the second established LDP session indicating a request to subscribe to the multicast group and an indication of the label that the intermediate node should apply to this traffic. For instance, in this example, the message 220 specifies the requested multicast group ("1.1.1.1") and the label to apply this group ("L11"). Upon receiving this message 220, the intermediate node 106 may access the mLDP datastore 130 to determine that that the datastore already includes an entry for this particular multicast group. Thus, the intermediate node 106 may add an entry indicating that the new remote label ("L11") is also associated with the multicast group and the local label of the intermediate node 108 for this group ("L20"). Furthermore, given that the intermediate node 106 has already instructed the direct node to forward this multicast traffic with the local label of the intermediate node 106 ("L20") to the intermediate node 106, the intermediate node 106 may refrain from sending an additional message to the direct node 104.

Figure 2E:
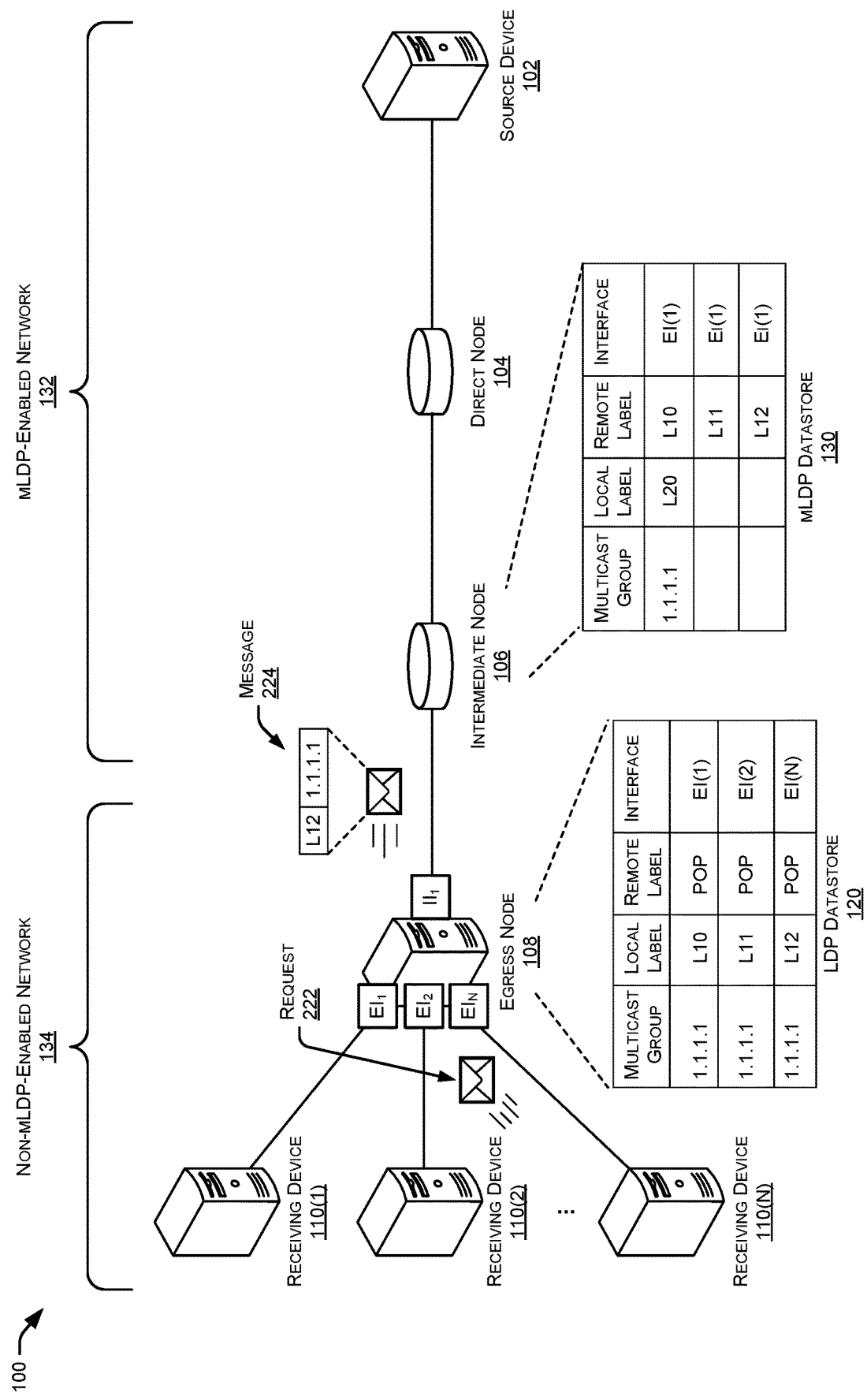
FIG. 2E illustrates an example scenario where a third receiving device coupled to a third egress interface of the egress node requests to subscribe to the multicast group. In response, the egress node stores an association between a third label and the third interface and shares this information the intermediate node such that the intermediate node may attach this third label prior to forwarding multicast traffic from the source device to the egress node via the third LDP session.

FIG. 2E continues the example scenario and illustrates that the third receiving device 110(N), coupled to the third egress interface of the egress node 108, sends a request 222 to subscribe to the same multicast group associated with the source device 102. In response, the egress node 108 stores, in its LDP datastore 120, an association between the specified multicast group (e.g., "1.1.1.1"), a third local label (e.g., "L12"), the remote label (in this example, POP, given that the receiving devices do not utilize LDP), and the egress interface associated with the receiving device 110(N) that sent the request (e.g., "EI(N)").

After storing this information in the LDP datastore 120, the egress node 108 may send a message 224 to the intermediate node via the third established LDP session indicating a request to subscribe to the multicast group and an indication of the label that the intermediate node should apply to this traffic. For instance, in this example, the message 224 specifies the requested multicast group ("1.1.1.1") and the label to apply this group ("L12"). Upon receiving this message 220, the intermediate node 106 may access the mLDP datastore 130 to determine that that the datastore already includes an entry for this particular multicast group. Thus, the intermediate node 106 may add yet another entry indicating that the new remote label ("L12") is also associated with the multicast group and the local label of the intermediate node 108 for this group ("L20"). Furthermore, given that the intermediate node 106 has already instructed the direct node to forward this multicast traffic with the local label of the intermediate node 106 ("L20") to the intermediate node 106, the intermediate node 106 may refrain from sending an additional message to the direct node 104.

Figure 3:
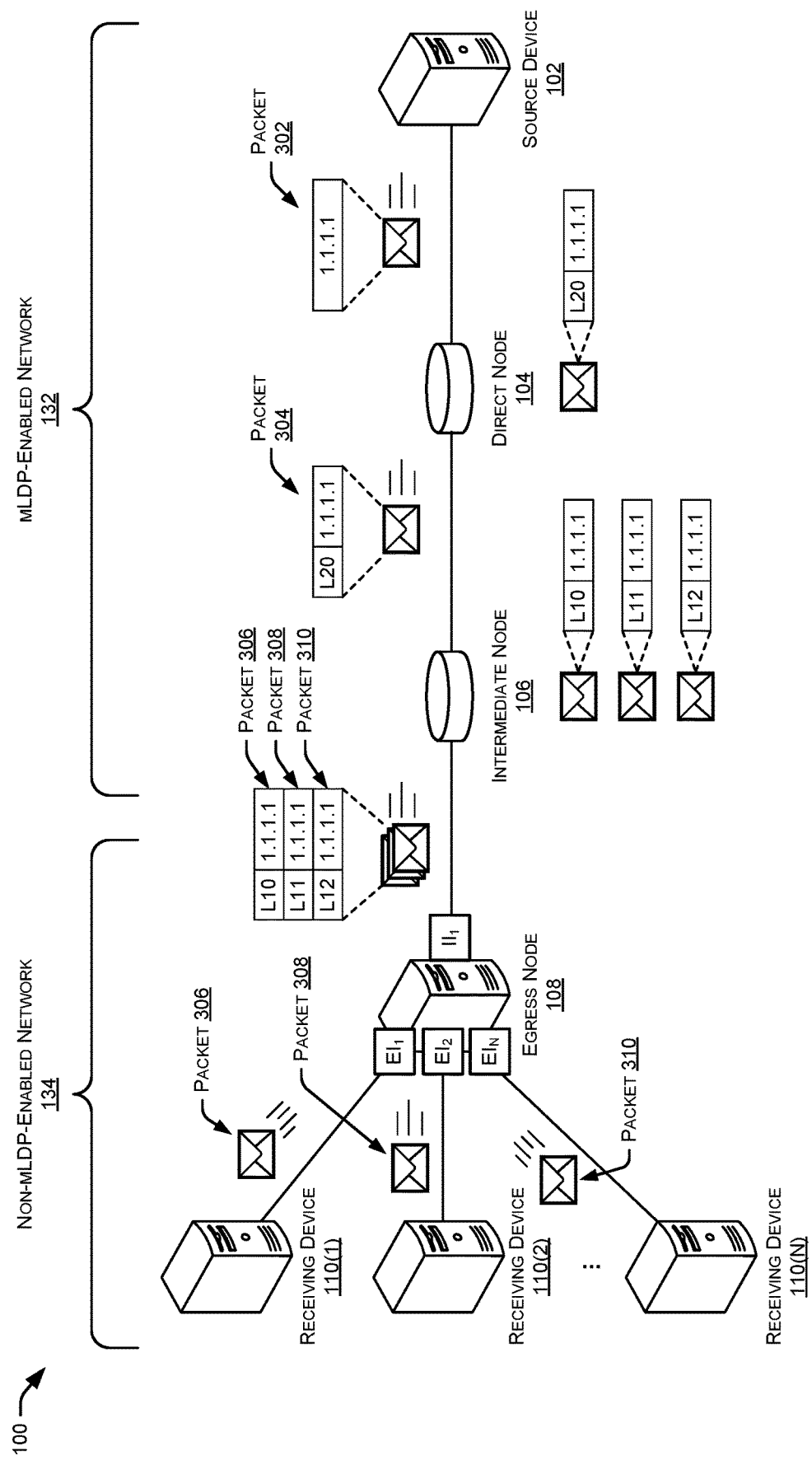
FIG. 3 illustrates how multicast traffic may flow within the architecture of FIG. 1 after the scenarios described above with reference to FIGS. 2A-E.

FIG. 3 illustrates how multicast traffic may flow within the network 100 after the scenarios described above with reference to FIGS. 2A-E. In this example, the source device 102 may send a packet 302 to the direct node 104 in the network 100, with the packet 302 specifying that it is associated with the example multicast group ("1.1.1.1"). Upon receiving the packet 302, the direct node may analyze its mLDP datastore to determine that it is to add a label, "L20", to the packet and send it along to the intermediate node 106. FIG. 3 thus illustrates the direct node 104 sending a packet 304 to the intermediate node 106. It is to be appreciated that the packet 304 may comprise the same contents of the packet 302, albeit with the new label ("L20") appended to this data.

Upon receiving the packet 304, the intermediate node 106 may access its mLDP datastore 130 and determine, using the label ("L20"), that the intermediate node 106 is to send three copies of this packet to three different destinations. More specifically, the intermediate node 106 may determine that it is to generate three copies of the packet 304 and send a first copy with a first label ("L10") to the first egress interface of the egress node 108, a second copy with a second label ("L11") to the second egress interface of the egress node 108, and a third copy with a third label ("L12") to the third egress interface of the egress node 108. As such, FIG. 3 illustrates that the intermediate node generates a packet 306 having the first label, a packet 308 having the second label, and a packet 310 having the third label and sends these packets to the egress node 108.

Upon receiving these three packets 306, 308, and 310, the egress node accesses its LDP datastore 120 and determines, using each respective label, where to send each of the packets. For example, the egress node 108 may determine, using the first label ("L10"), that the packet 306 is to be sent to the receiving device 110(1) via the first egress interface. Thus, the egress node 108 may remove the label and send the packet 306 to the receiving device 110(1) via the first egress interface. Similarly, the egress node 108 may determine, using the second label ("L11"), that the packet 308 is to be sent to the receiving device 110(2) via the second egress interface. Thus, the egress node 108 may remove the label and send the packet 308 to the receiving device 110(2) via the second egress interface. Finally, the egress node 108 may determine, using the third label ("L12"), that the packet 310 is to be sent to the receiving device 110(N) via the third egress interface. Thus, the egress node 108 may remove the label and send the packet 310 to the receiving device 110(N) via the third egress interface.

FIGS. 4A-F collectively illustrate a flow diagram of a process 400 for enabling a non-mLDP-enabled portion of a network to interface and function with an mLDP-enabled portion of the network. At an operation 402, the egress node 108 may send a first LDP discovery message to the intermediate node 106. For example, the egress node 108 may determine that the intermediate node 106 is its LDP peer and may send a first LDP discovery message corresponding to a first egress interface of the egress node 108. In some instances, the first receiving device 110(1) couples to the egress node 108 via the first egress interface. At an operation 404, the intermediate node 106 receives the first LDP discovery message and, at an operation 406, the egress node 108 and the intermediate node 106 establish a first LDP session between the intermediate node 106 and the first egress interface of the egress node 108.

At an operation 408, the egress node 108 may send a second LDP discovery message to the intermediate node 106. For example, the egress node 108 may determine that the intermediate node 106 is its LDP peer and may send the LDP discovery message corresponding to a second egress interface of the egress node 108. In some instances, the second receiving device 110(2) couples to the egress node 108 via the second egress interface. At an operation 410, the intermediate node 106 receives the second LDP discovery message and, at an operation 412, the egress node 108 and the intermediate node 106 establish a second LDP session between the intermediate node 106 and the second egress interface of the egress node 108.

At an operation 414, the first receiving device 110(1) sends, to the egress node and via the first egress interface to which it couples, a request to subscribe to a specified multicast group. At an operation 416, the egress node 108 receives the request via the first egress interface.

Figure 4A:
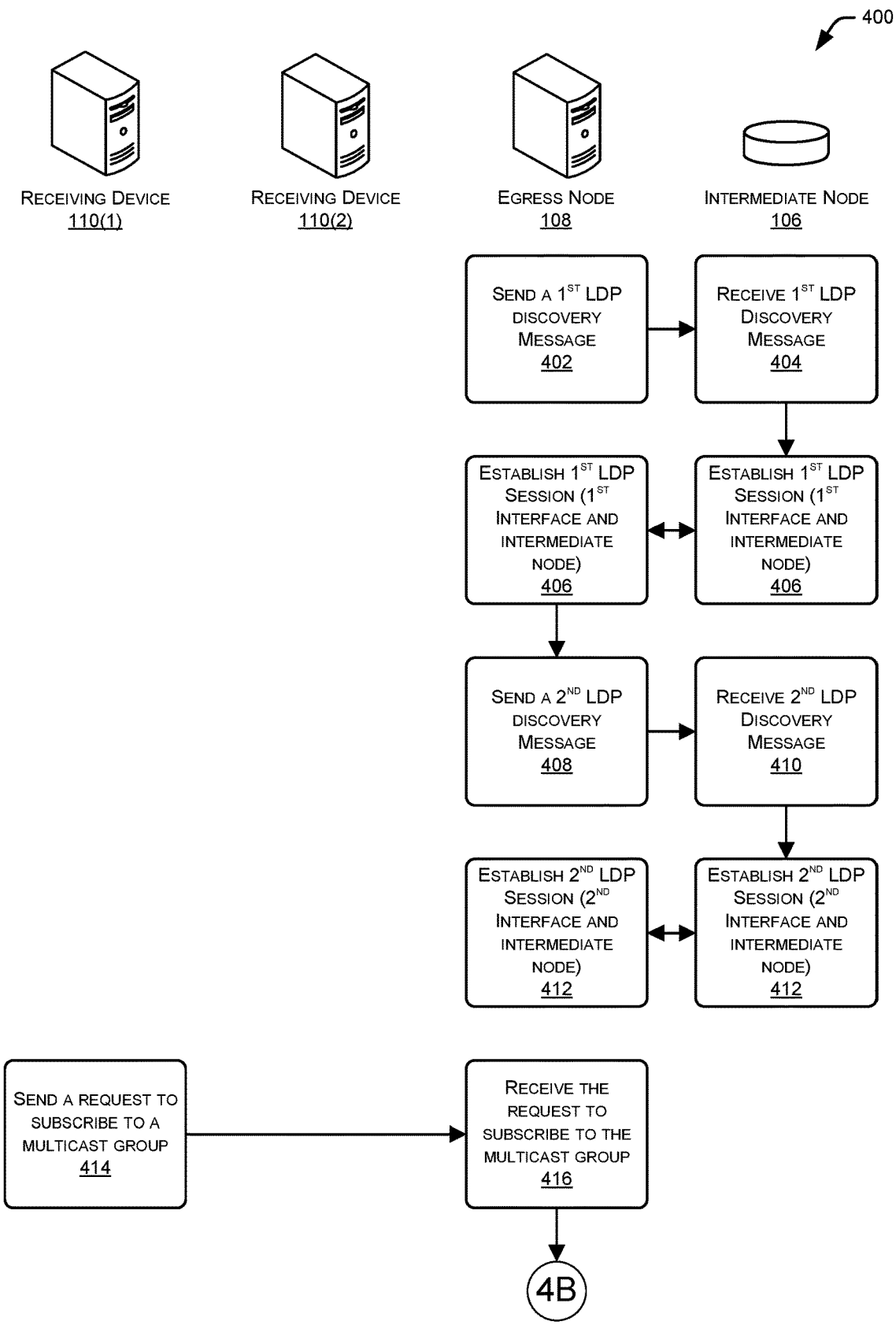
FIGS. 4A-F collectively illustrate a flow diagram of a process for enabling a non-mLDP-enabled portion of a network to interface and function with an mLDP-enabled portion of the network.
Figure 4B:
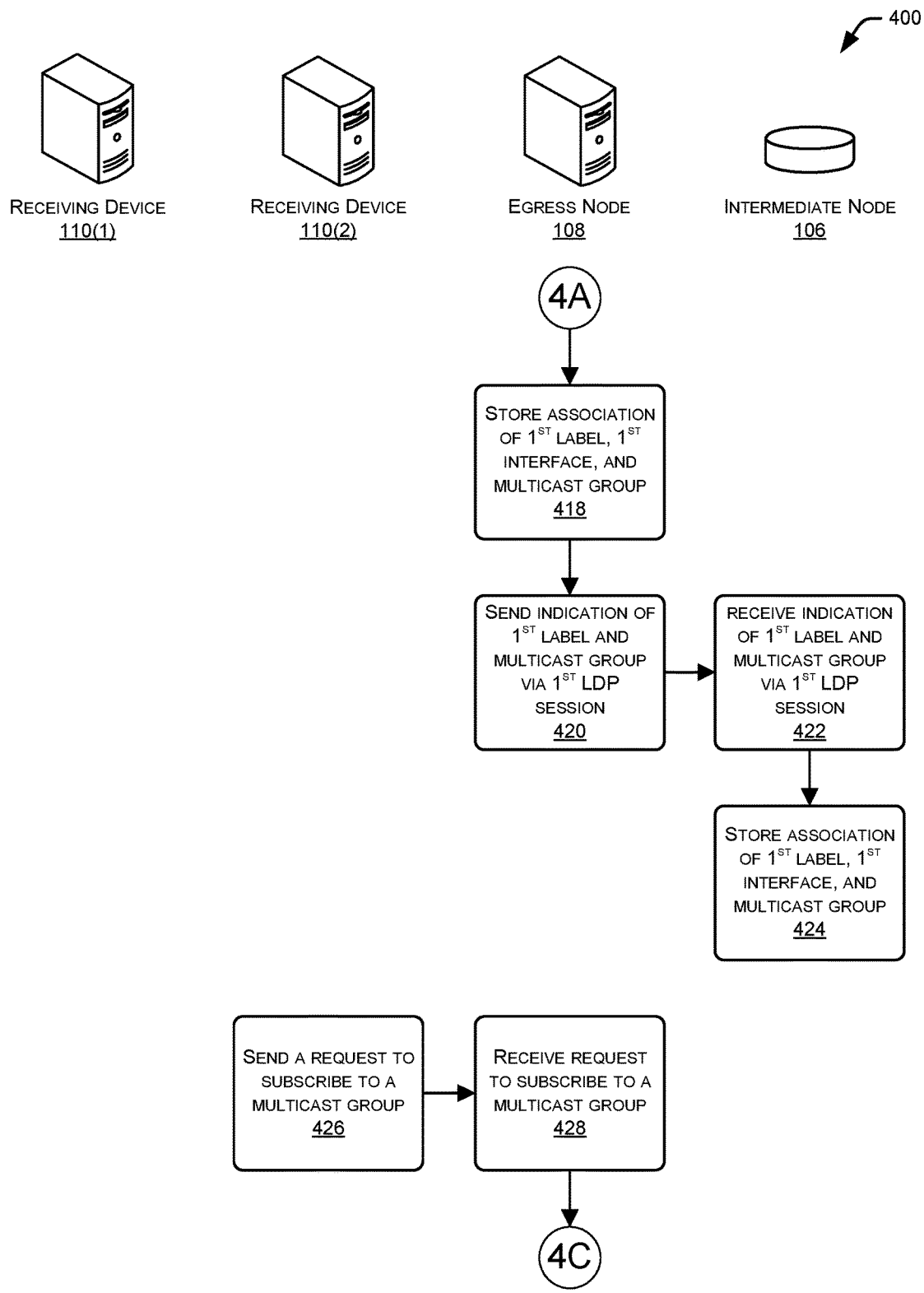

FIG. 4B continues the illustration of the process 400 and includes, at an operation 418, the egress node storing an association of a first label, the first interface, and the multicast group. At an operation 420, the egress node 108 sends an indication of the first label and the multicast group to the intermediate node via the first LDP session. At an operation 422, the intermediate node 106 receives, via the first LDP session, the indication of the first label and the multicast group and, at an operation 424, stores an association of the first label, the first interface, and the multicast group in its mLDP datastore.

At an operation 426, the second receiving device 110(2) sends, to the egress node and via the second egress interface to which it couples, a request to subscribe to the same multicast group. At an operation 428, the egress node 108 receives the request via the second egress interface.

Figure 4C:
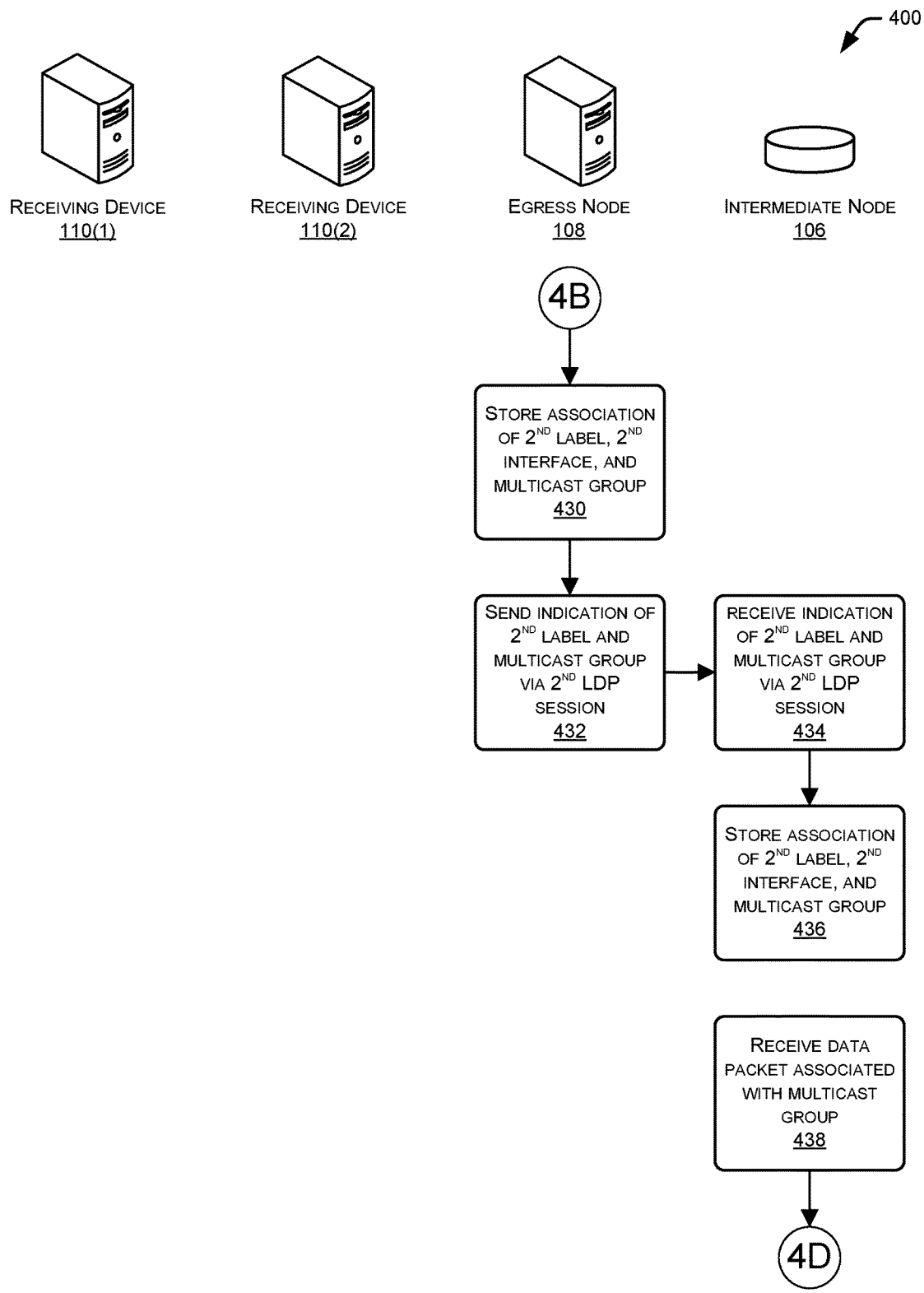

FIG. 4C continues the illustration of the process 400 and includes, at an operation 418, the egress node storing an association of a second label, the second interface, and the multicast group. At an operation 432, the egress node 108 sends an indication of the second label and the multicast group to the intermediate node via the second LDP session. At an operation 434, the intermediate node 106 receives, via the second LDP session, the indication of the second label and the multicast group and, at an operation 436, stores an association of the second label, the second interface, and the multicast group in its mLDP datastore.

At an operation 438, the intermediate node 106 receives a data packet associated with the multicast group. For example, a source of the multicast group may have sent the data packet to a node in the network to which the source device 102 directly couples. This direct node 104 may have, in turn, determined that the intermediate node 106 requested to receive this multicast traffic and may have determined a label, previously specified by the intermediate node 106, to append to this traffic. The direct node 104 may then have appended the label and send the labeled data packet to the intermediate node.

Figure 4D:
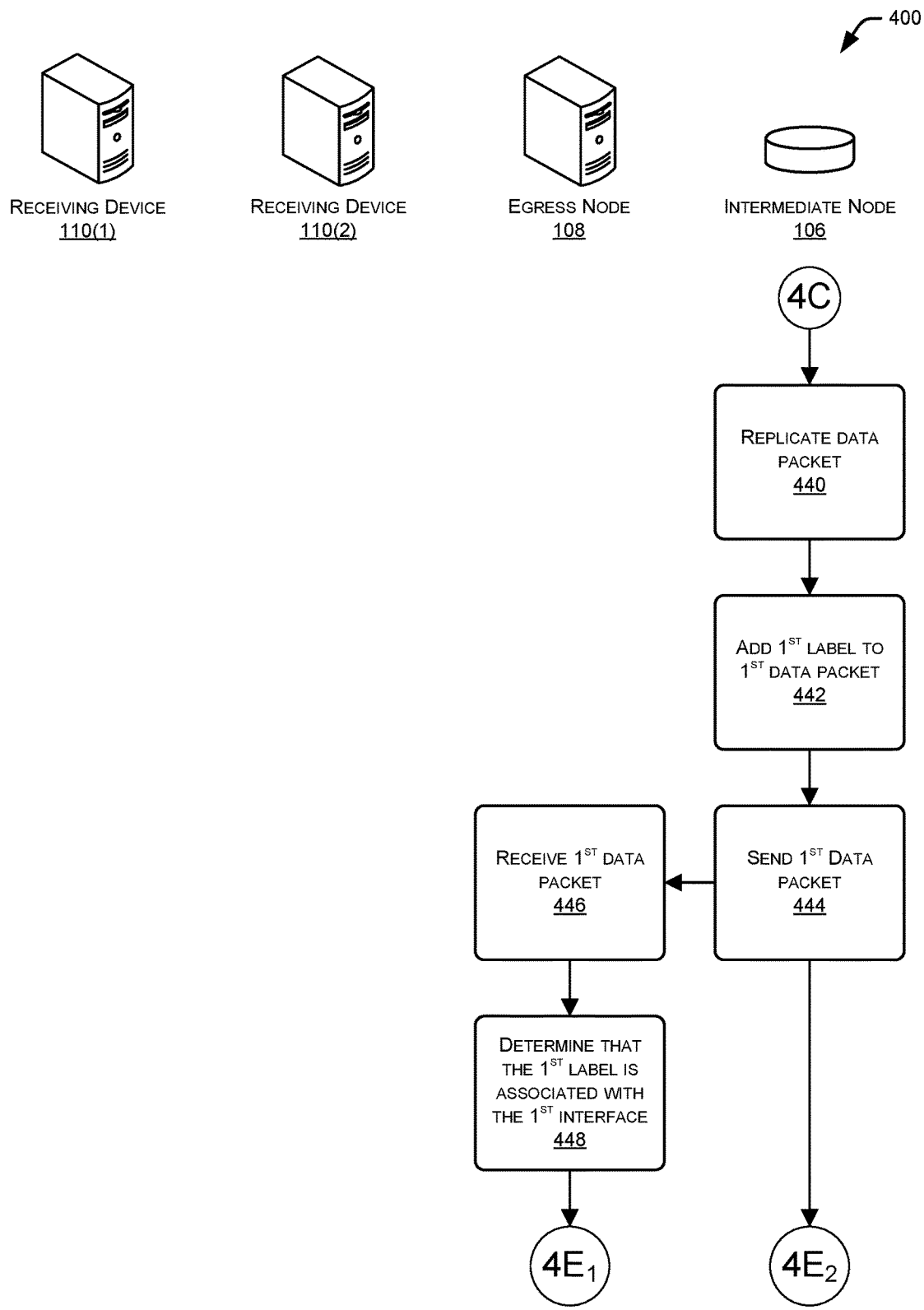

FIG. 4D continues the illustration of the process 400 and includes, at an operation 440, the intermediate node replicating the received data packet. For example, upon receiving the data packet, the intermediate node 106 may have identified labeled and access its mLDP datastore to determine that the intermediate node is to send a copy of this packet to more than one node in the network. For example, the intermediate node 106 may access its mLDP datastore to determine that the intermediate node is to send a first copy of the packet to the first interface of the egress node 108 and a second copy of the data packet to the second interface of the egress node 108.

At an operation 442, the intermediate node adds a first label to a first data packet and, at 444, sends the first data packet to the egress node 108. At an operation 446, the egress node receives the first data packet and, at an operation 448, determines that the first label is associated with the first interface.

Figure 4E:
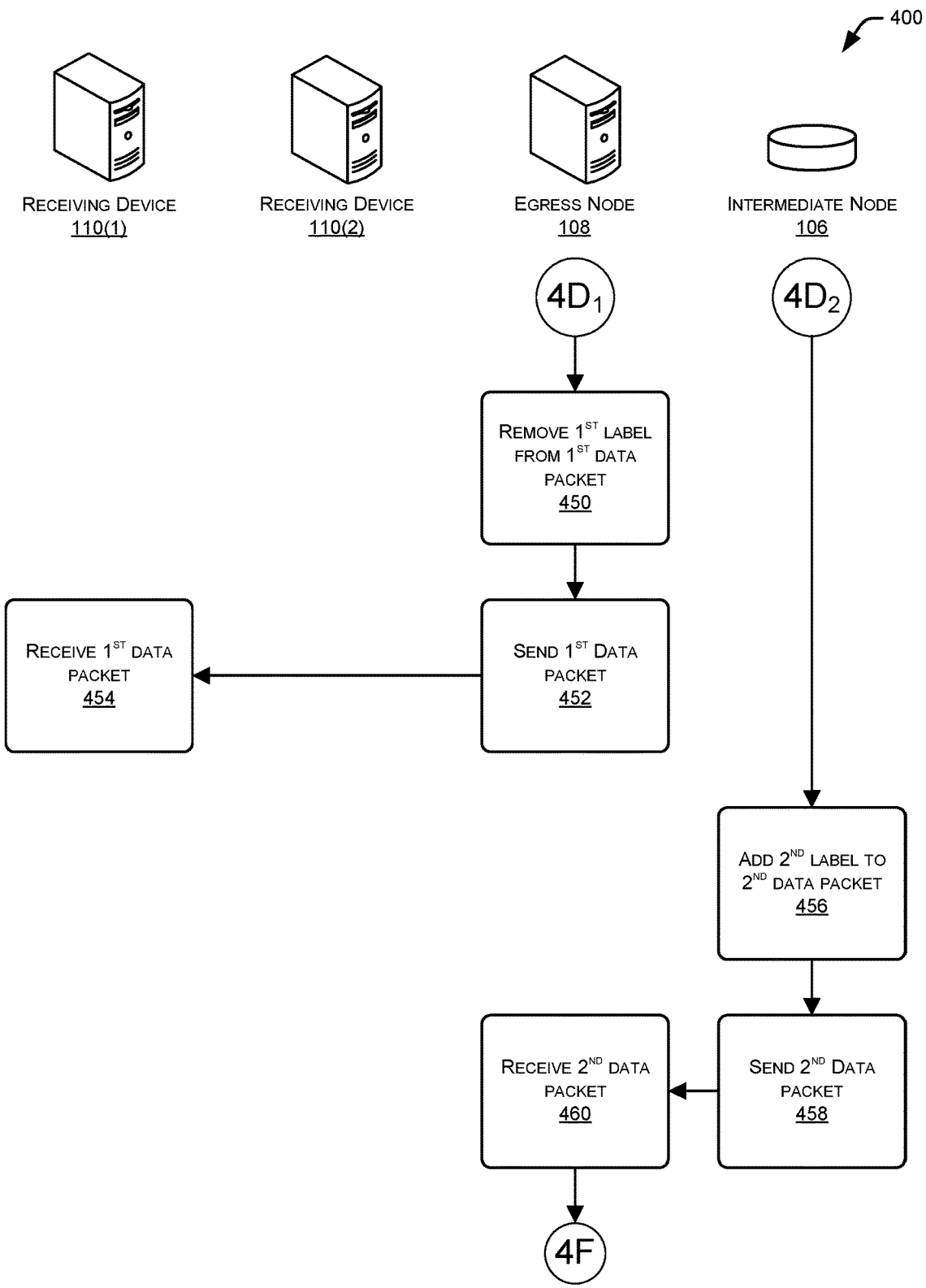

FIG. 4E continues the illustration of the process 400 and includes, at an operation 450, the egress node 108 remove the first label from the first data packet and, at an operation 452, sending the first data packet to the first receiving device 110(1) via the first interface.

In addition, at an operation 456, the intermediate node 106 may add a second label to a second data packet. In some instances, the second data packet comprises the same contents of the first data packet, which in turn comprises the same contents as the data packet initially received at the intermediate node at the operation 438. At an operation 458, the intermediate node 106 sends the second data packet with the second label to the egress node 108, which receives the second data packet at an operation 460.

Figure 4F:
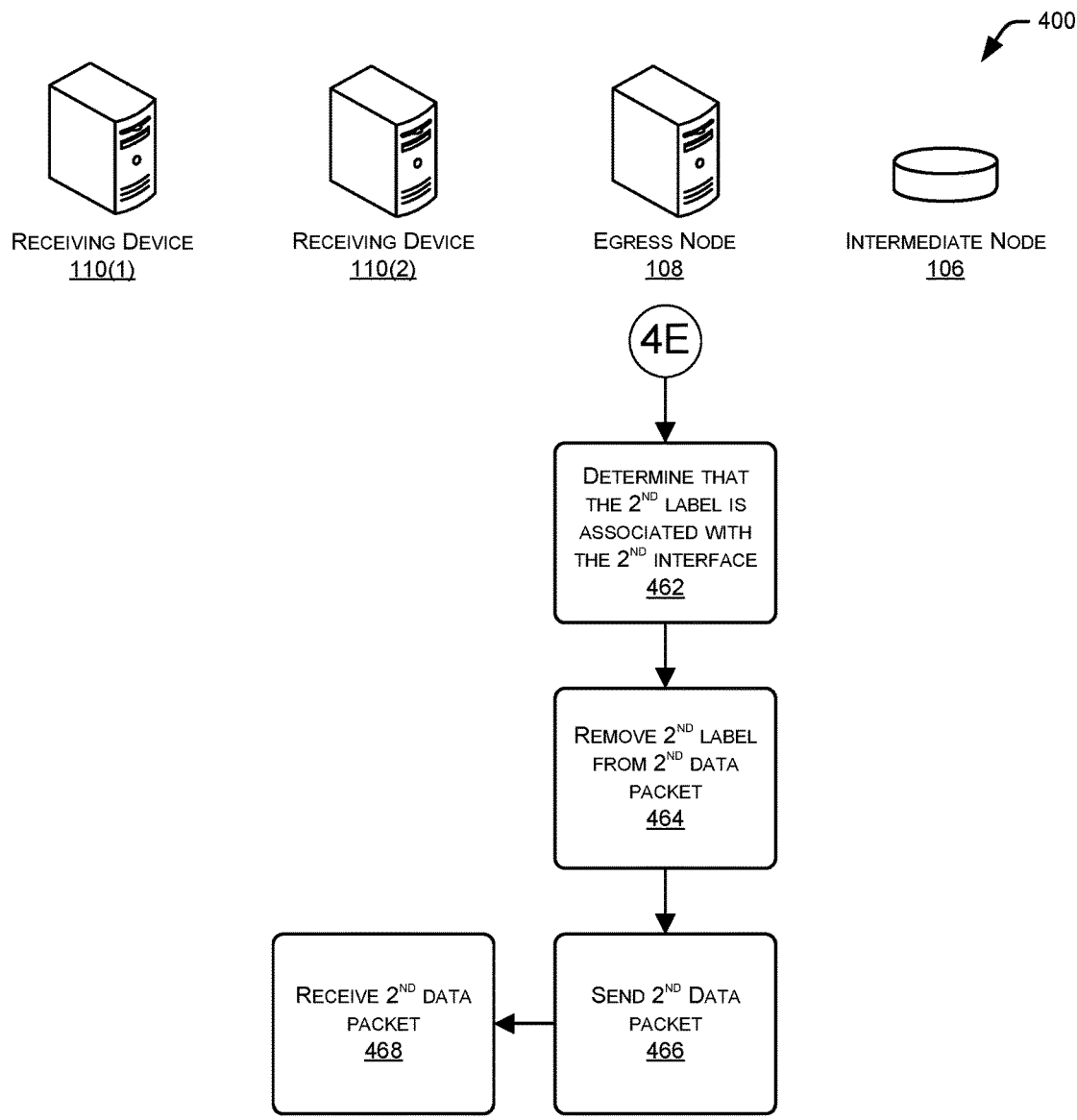

FIG. 4F concludes the illustration of the process 400 and includes, at an operation 462, the egress node 108 determining that the second label is associated with the second interface. Thus, at an operation 464, the egress node 108 removes the second label from the second data packet and, at an operation 466, sends the second data packet to the second receiving device 110(2) via the second interface. The second receiving device 110(2) receives the second data packet at an operation 468. As noted above, in some instances the first and/or second receiving devices 110(1) and 110(2) may send the packet along to other nodes in the network, towards respective destination devices that have subscribed to the multicast group.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-E and 4A-F, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
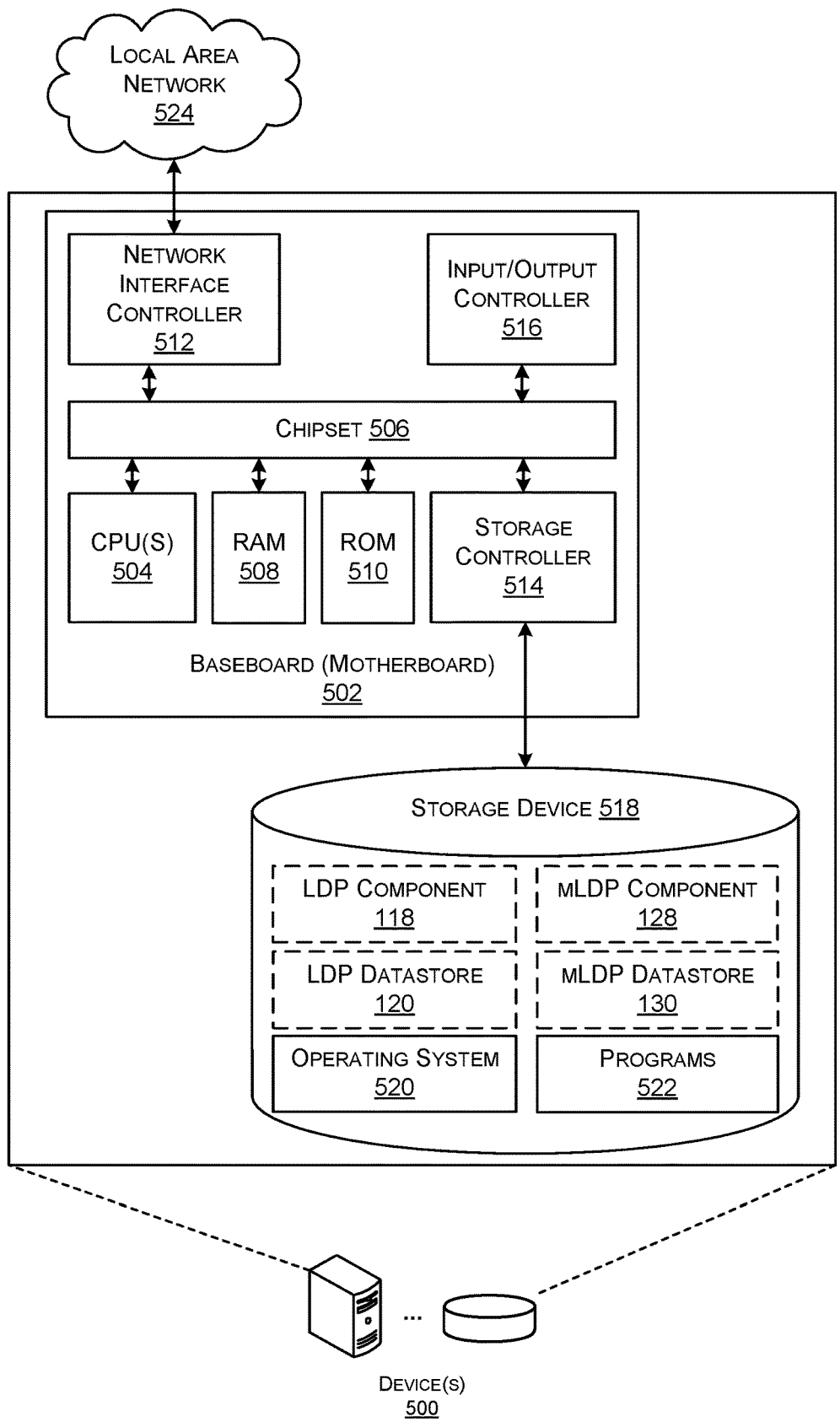
FIG. 5 is a computer architecture diagram showing an illustrative computer hardware architecture for implementing computing devices configured to implement the techniques described herein.

FIG. 5 is a computer architecture diagram showing an illustrative computer hardware architecture for implementing a device 500 that can be utilized to implement aspects of the various technologies presented herein. The source device 102, the direct node 104, the intermediate node 106, the egress node 108, and/or the receiving devices 110(1)-(N), discussed above, may include some or all of the components discussed below with reference to the device 500.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the devices 500 can also be configured to execute a resource manager capable of instantiating and/or managing the computing resources. In the case of VM instances, for example, the resource manager can be a hypervisor or another type of program configured to enable the execution of multiple VM instances on a single server device 500. Devices 500 in a data center can also be configured to provide network services and other types of services.

The device 500 includes a baseboard 502, or "motherboard," which is a printed circuit board to which a multitude of components or devices can be connected by way of a system bus or other electrical communication paths. In one illustrative configuration, one or more central processing units (CPUs) 504 operate in conjunction with a chipset 506. The CPUs 504 can be standard programmable processors that perform arithmetic and logical operations necessary for the operation of the device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the device 500. The chipset 506 can further provide an interface to a computer-readable storage medium such as a read-only memory (ROM) 510 or non-volatile RAM (NVRAM) for storing basic routines that help to startup the device 500 and to transfer information between the various components and devices. The ROM 510 or NVRAM can also store other software components necessary for the operation of the device 500 in accordance with the configurations described herein.

The device 500 can operate in a networked environment using logical connections to remote computing devices and computer systems through a network, such as a local area network 524. The chipset 506 can include functionality for providing network connectivity through a Network Interface Card (NIC) 512, such as a gigabit Ethernet adapter. The NIC 512 is capable of connecting the device 500 to other computing devices over the network. It should be appreciated that multiple NICs 512 can be present in the device 500, connecting the computer to other types of networks and remote computer systems.

The device 500 can be connected to a storage device 518 that provides non-volatile storage for the computer. The storage device 518 can store an operating system 520, programs 522, and data, which have been described in greater detail herein. The storage device 518 can be connected to the device 500 through a storage controller 514 connected to the chipset 506. The storage device 518 can consist of one or more physical storage units. The storage controller 514 can interface with the physical storage units through a serial attached SCSI (SAS) interface, a serial advanced technology attachment (SATA) interface, an FC interface, or other type of interface for physically connecting and transferring data between computers and physical storage units.

The device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 500 can further read information from the storage device 518 by detecting the physical states or characteristics of one or more particular locations within the physical storage units.

In addition to the mass storage device 518 described above, the device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 500.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the device 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the device 500.

In one embodiment, the storage device 518 or other computer-readable storage media is encoded with computer-executable instructions which, when loaded into the device 500, transform the computer from a general-purpose computing system into a special-purpose computer capable of implementing the embodiments described herein. These computer-executable instructions transform the device 500 by specifying how the CPUs 504 transition between states, as described above. According to one embodiment, the device 500 has access to computer-readable storage media storing computer-executable instructions which, when executed by the device 500, perform the various processes described above with regard to FIGS. 2A-3D. The device 500 can also include computer-readable storage media having instructions stored thereupon for performing any of the other computer-implemented operations described herein.

The device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the device 500 might not include all of the components shown in FIG. 5, can include other components that are not explicitly shown in FIG. 5, or might utilize an architecture completely different than that shown in FIG. 5.

The device 500 may also store, in the storage device 518, the LDP component 118, the LDP datastore 120, the mLDP component 128, and/or mLDP datastore 130 for performing some or all of the techniques described above with reference to FIGS. 1-4F.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method implemented at least in part by a first computing device, the method comprising:
    sending, from the first computing device, a first label-distribution-protocol (LDP) discovery message to a second computing device via a first interface, wherein the second computing device is coupled to the first computing device;
    sending, from the first computing device, a second LDP discovery message to the second computing device via the first interface;
    establishing a first LDP session between a first second interface of the first computing device and the second computing device, wherein establishing the first LDP session is at least partly in response to sending the second LDP discovery message;
    establishing a second LDP session between a third interface of the first computing device and the second computing device;
    receiving, at the first computing device, a request from a third computing device to subscribe to a multicast group, the third computing device coupled to the first computing device via the second interface;
    storing, in an LDP datastore of the first computing device, an association between a first short-path label, the multicast group, and the second interface;
    sending, by the first computing device and to the second computing device via the first LDP session, an indication that the first short-path label is associated with the multicast group;
    receiving, at the first computing device, a request from a fourth computing device to subscribe to the multicast group, the fourth computing device coupled to the first computing device via the third interface;
    storing, in the LDP datastore, an association between a second short-path label, the multicast group and, the third interface; and
    sending, by the first computing device and to the second computing device via the second LDP session, an indication that the second short-path label is associated with the multicast group.

2. The method as recited in claim 1, further comprising:
    receiving, at the first computing device and from the second computing device, a first data packet associated with the first short-path label;
    sending, by the first computing device, at least a portion of the first data packet to the third computing device;
    receiving, at the first computing device and from the second computing device, a second data packet associated with the second short-path label; and
    sending, by the first computing device, at least a portion of the second data packet to the fourth computing device.

3. The method as recited in claim 2, wherein:
    the first data packet and the second data packet are each associated with the multicast group; and
    the second data packet comprises a copy of at least a portion of the first data packet.

4. The method as recited in claim 2, further comprising:
    determining, using the LDP datastore, that the first short-path label is associated with the first interface;

removing the first short-path label from the first data packet at least partly prior to the sending of at least a portion of the first packet to the third computing device;

determining, using the LDP datastore, that the second short-path label is associated with the third interface; and removing the second short-path label from the second data packet at least partly prior to the sending of at least a portion of the second data packet to the fourth computing device;

and wherein:
the sending at least a portion of the first data packet comprises sending at least a portion of the first data packet to the third computing device at least partly in response to determining that the first short-path label is associated with the second interface; and the sending at least a portion of the second data packet comprises sending at least a portion of the second data packet to the fourth computing device at least partly in response to determining that the second short-path label is associated with the third interface.

5. The method as recited in claim 1, further comprising:
establishing a third LDP session between a fourth interface of the first computing device and the second computing device;

receiving, at the first computing device, a request from a fifth computing device to subscribe to the multicast group, the fifth computing device coupled to the first computing device via the fourth interface;

storing, in the LDP datastore, an association between a third short-path label, the multicast group and, the fourth interface; and sending, by the first computing device and to the second computing device via the third LDP session, an indication that the third short-path label is associated with the multicast group.

6. A method comprising:
sending, from a first computing device to a second computing device, a first label-distribution-protocol (LDP) discovery message;

establishing a first LDP session between a first interface of the first computing device and the second computing device at least partly in response to the sending of the first LDP discovery message;

sending, from the first computing device to the second computing device, a second LDP discovery message; and establishing a second LDP session between a second interface of the first computing device and the second computing device at least partly in response to the sending of the second LDP discovery message.

7. The method as recited in claim 6, wherein:
the first computing device couples to a third computing device via the first interface; and the first computing device couples to a fourth computing device via the second interface.

8. The method as recited in claim 6, wherein:
the sending the first LDP discovery message comprises sending the first LDP discovery message to the second computing device over a third interface of the first computing device, the first computing device being coupled to the second computing device via the third interface; and the sending the second LDP discovery message comprises sending the second LDP discovery message to the second computing device via the third interface.

9. The method as recited in claim 6, further comprising:
receiving, at the first computing device and via the first interface, a request from a third computing device to subscribe to a multicast group;

storing, in an LDP datastore of the first computing device, an association between a first label, the multicast group, and the first interface; and sending, by the first computing device and to the second computing device via the first LDP session, an indication that the first label is associated with the multicast group.

10. The method as recited in claim 9, further comprising:
receiving, at the first computing device, a data packet associated with the first label; and sending, by the first computing device, at least a portion of the data packet to the third computing device.

11. The method as recited in claim 10, further comprising determining, using the LDP datastore, that the first label is associated with the first interface; and removing the first label from the data packet at least partly prior to the sending at least a portion of the data packet to the third computing device.

12. The method as recited in claim 9, further comprising:
receiving, at the first computing device and via the second interface, a request from a fourth computing device to subscribe to the multicast group;

storing, in the LDP datastore, an association between a second label, the multicast group, and the second interface; and sending, by the first computing device and to the second computing device via the second LDP session, an indication that the second label is associated with the multicast group.

13. The method as recited in claim 12, further comprising
receiving, at the first computing device, a first data packet associated with the first label;

sending, by the first computing device, at least a portion of the first data packet to the third computing device via the first interface;

receiving, at the first computing device, a second data packet associated with the second label, the second data packet comprising a copy of at least a portion of the first data packet; and sending, by the first computing device, at least a portion of the second data packet to the fourth computing device.

14. A first computing device, comprising:
a first interface;
a second interface;
a third interface;
one or more processors; and
one or more non-transitory computer-readable media storing computer-executable instructions that, when executed by the one or more processors, cause the one or more processors to perform acts comprising:
receiving, from a second computing device and via the first interface, a first data packet associated with a first label, wherein the first data packet is associated with a multicast group to which a third computing device and a fourth computing device have previously subscribed to;

determining that the first label is associated with the second interface;

sending at least a portion of the first data packet to the third computing device via the second interface;

receiving, from the second computing device and via the first interface, a second data packet associated with a second label, the second data packet comprising a replication of at least a portion of the first data packet;

determining that the second label is associated with the third interface; and sending at least a portion of the second data packet to the fourth computing device via the third interface.

15. The first computing device as recited in claim 14, the one or more non-transitory computer-readable media further storing computer-executable instructions that, when executed by the one or more processors, cause the one or more processors to perform acts comprising:

sending a first label-distribution-protocol (LDP) discovery message to the second computing device via the first interface;

establishing a first LDP session between the second interface of the first computing device and the second computing device at least partly in response to the sending of the first LDP discovery message;

sending a second LDP discovery message to the second computing device via the first interface; and establishing a second LDP session between the third interface of the first computing device and the second computing device at least partly in response to the sending of the second LDP discovery message.

16. The first computing device as recited in claim 14, further comprising a label-distribution-protocol (LDP) datastore, and wherein the one or more non-transitory computer-readable media further store computer-executable instructions that, when executed by the one or more processors, cause the one or more processors to perform acts comprising:

receiving, via the second interface, a request from the third computing device to subscribe to a multicast group;

storing, in the LDP datastore, an association between a first label, the multicast group, and the second interface;

receiving, via the third interface, a request from the fourth computing device to subscribe to the multicast group;

storing, in the LDP datastore, an association between a second label, the multicast group, and the third interface.

17. The first computing device as recited in claim 16, the one or more non-transitory computer-readable media further storing computer-executable instructions that, when executed by the one or more processors, cause the one or more processors to perform acts comprising:

establishing a first LDP session between the second interface of the first computing device and the second computing device;

sending, to the second computing device and via the first LDP session, an indication that the first label is associated with the multicast group;

establishing a second LDP session between the third interface of the first computing device and the second computing device; and sending, to the second computing device and via the second LDP session, an indication that the second label is associated with the multicast group.

18. The first computing device as recited in claim 14, the one or more non-transitory computer-readable media further storing computer-executable instructions that, when executed by the one or more processors, cause the one or more processors to perform acts comprising:

removing the first label from the first data packet at least partly prior to the sending at least a portion of the first packet to the third computing device; and removing the second label from the second data packet at least partly prior to the sending at least a portion of the second packet to the fourth computing device.

* * * * *

UNITED STATES PATENT AND TRADEMARK OFFICE
CERTIFICATE OF CORRECTION

PATENT NO. : 11,310,154 B2
APPLICATION NO. : 16/582906
DATED : April 19, 2022
INVENTOR(S) : Wijnands et al.

It is certified that error appears in the above-identified patent and that said Letters Patent is hereby corrected as shown below:

In the Claims

Column 18, Line 17, Claim 1 change "first second" to --second--.

Signed and Sealed this
Sixteenth Day of August, 2022

*Katherine Kelly Vidal*

Katherine Kelly Vidal
*Director of the United States Patent and Trademark Office*